United States Patent [19]
Dibner

[11] 4,064,368
[45] Dec. 20, 1977

[54] CLOSED-LOOP EMERGENCY ALARM AND RESPONSE SYSTEM

[75] Inventor: Andrew S. Dibner, Newton, Mass.

[73] Assignee: Lifeline Systems, Inc., Boston, Mass.

[21] Appl. No.: 693,296

[22] Filed: June 7, 1976

[51] Int. Cl.² .......................................... H04M 11/04
[52] U.S. Cl. .................................................. 179/5 R
[58] Field of Search ............ 179/5 R, 5 P, 2 A, 2 TC, 179/27 FF, 27 DB; 58/152 T

[56] References Cited

U.S. PATENT DOCUMENTS

| | | | |
|---|---|---|---|
| 3,206,551 | 9/1965 | Crowson | 179/5 R |
| 3,427,403 | 2/1969 | Stokes | 179/5 R |
| 3,531,597 | 9/1970 | Andrews | 179/2 A |
| 3,662,111 | 5/1972 | Rubinstein | 179/5 P |

Primary Examiner—Kathleen H. Claffy
Assistant Examiner—Joseph A. Popek
Attorney, Agent, or Firm—Harness, Dickey & Pierce

[57] ABSTRACT

A closed-loop system for monitoring the condition of a person in a residence. A digital dialer-transceiver at the residence is connected to a telephone line and may be triggered by an emergency button or the running out of a timer. It transmits identification and alarm codes to a compatible digital transceiver at a central station and at the same time emits an alarm signal at the residence. The central station digital receiving unit acknowledges the communication, means being provided in response to this acknowledgement for changing the "alarm" signal at the residence to a "call received" signal. The central station operator calls emergency responders previously recruited for that residence. The responder arriving at the residence presses a reset button on the unit which transmits an "all clear" signal to the central station and changes the "call receive" mode of the residence signal to an "all clear" mode. The central station acknowledges the "all clear" signal to the residence and in response thereto, dialing of the transceiver at the residence is discontinued.

3 Claims, 2 Drawing Figures

CLOSED-LOOP EMERGENCY ALARM AND RESPONSE SYSTEM

BACKGROUND OF THE INVENTION

1. Field of the Invention

The invention relates to emergency alarm systems, and more particularly to systems for monitoring and responding to the needs of elderly of infirm persons confined to residences. The present invention is concerned particularly with arrangements for responding to a call for assistance and a flow of information between the residence and the central responding station in the time frames leading to, during and following the arrival of assistance at the residence.

2. Description of the Prior Art

My prior application Ser. No. 520,495, filed Nov. 4, 1974, now U.S. Pat. No. 3,989,900 shows and describes an emergency alarm system combined with a residential telephone which is capable of sending an alarm to a central station should the resident fail to use the telephone with a given frequency, say once a day. Other prior systems referred to in the aforementioned application have also been suggested for monitoring the inactivity of a resident and sending an emergency alarm to a central station. However, these prior systems do not include components capable of assuring the resident that his call for help has been received, and continuing to monitor the residence until help has arrived so that the danger of further harm due to lack of prompt assistance will be minimized.

BRIEF SUMMARY OF THE INVENTION

It is an object of the present invention of provide a novel and improved emergency alarm and response system which meets the shortcomings of previously known systems in this field and is capable not only of assuring the resident calling for assistance that help is on its way, but also permitting the central station monitor to be kept up to date on the arrival of assistance at the residence, so that alternative steps can be taken if the need arises.

It is another object to provide an improved alarm and response system of this nature which is flexible and versatile in use, utilizes human elements which are most likely to result in adequate assistance for the resident, and makes use of known transmitting and receiving components in a novel manner.

Briefly, the invention includes a closed-loop emergency alarm and response system comprising a transceiver located at a residence, a compatible at a central station, means at the residence for activating said first transceiver to send an alarm signal to said second transceiver and simultaneously activate an alarm signal at the residence, means at said second transceiver for sending an "acknowledge" signal to the first transceiver, means responsive to receipt of said "acknowledge" signal at the first transceiver for discontinuing said alarm signal at the residence and initiating a "call received" signal at the residence, means at the central station for facilitating the dispatch of emergency help to the residence, manual means at the residence operable by a person who has arrived at the residence in response to said dispatch from the central station to cause said residence transceiver to send an "all clear" signal to the central station transceiver and to discontinue the "call received" signal at the residence, means at the central station for causing an acknowledgement signal to be sent to the residence transceiver after receipt of said "all clear" signal, and means responsive to receipt of said last-mentioned acknowledgement signal by the residence transceiver for terminating said sending of the "all clear" signal.

DESCRIPTION OF THE PREFERRED EMBODIMENT

Figure 1:
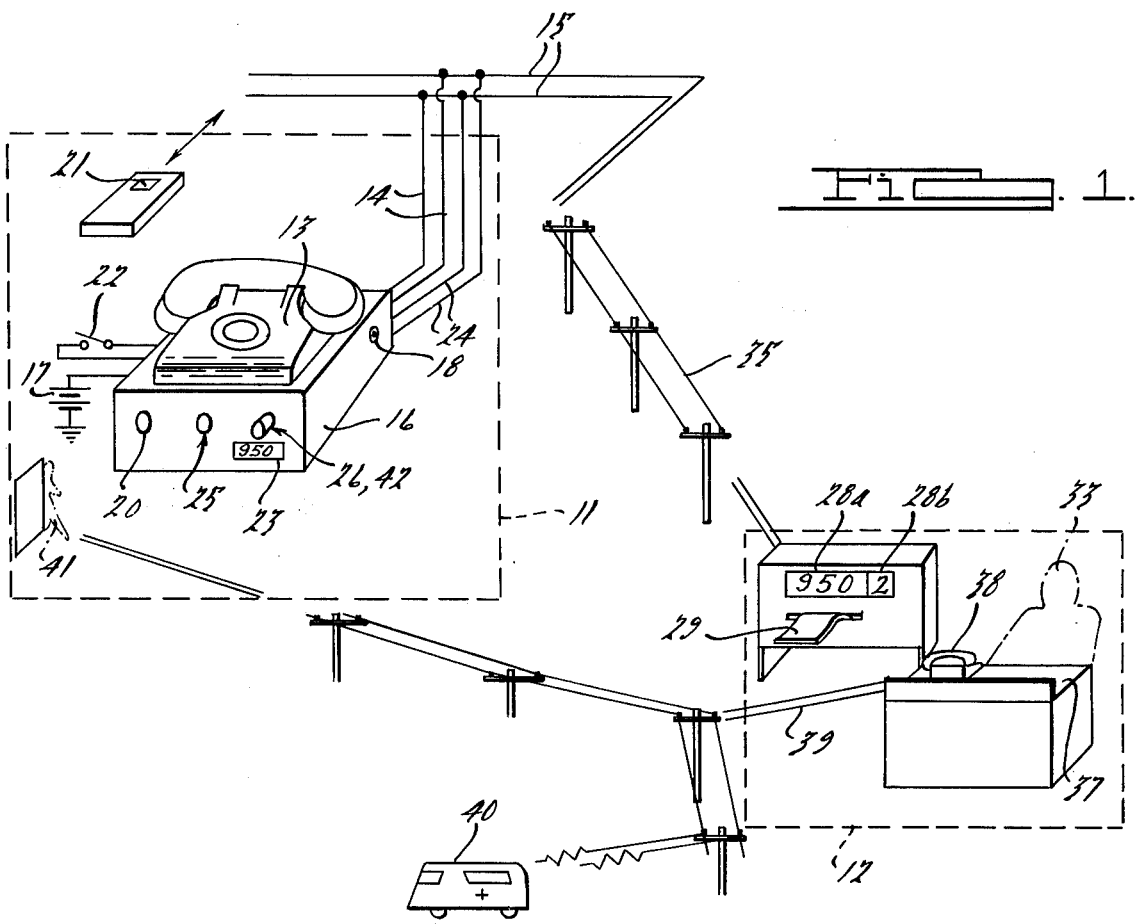
FIG. 1 is a diagrammatic view of the system of this invention.
Figure 2:
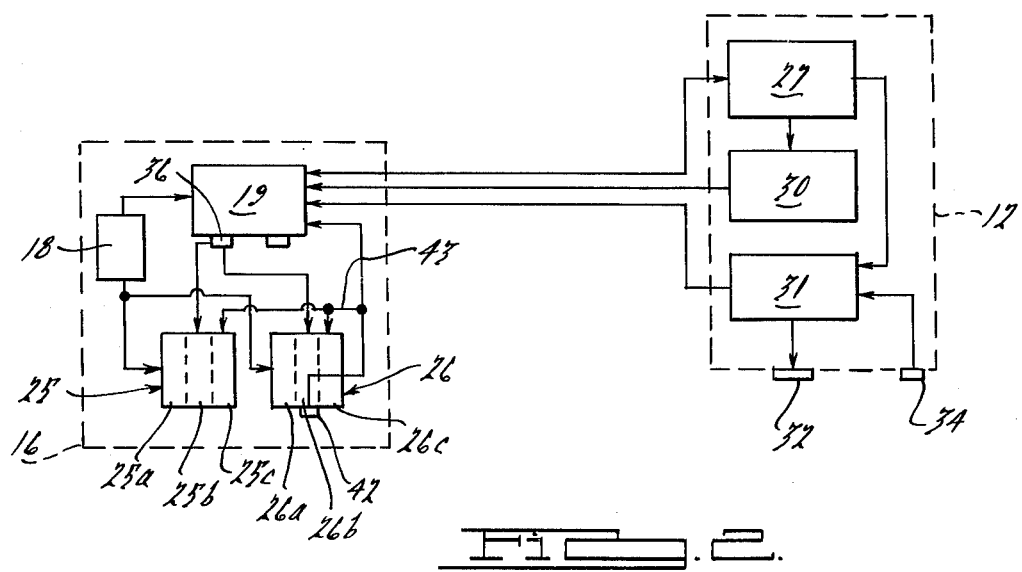
FIG. 2 is a schematic view showing the interconnections between the transceivers at the residence and central station as well as the connections between the components at each location.

The location of the residence is indicated in dotted lines at 11 while the central station location is indicated at 12. The central station may service many residences, each one being arranged similarly to residence 11. A residence has an existing telephone 13 which is connected by line 14 to a main telephone line 15. A unit 16 is associated with telephone 13 and incorporates means for monitoring the resident's inactivity as well as permitting him to call when help is needed. As described more completely in the aforementioned application, unit 16 has a power source 17 and a timer 18 which is reset each time the telephone is activated by lifting the receiver. If, due to inactivity of the resident caused by his incapacity, timer 18 runs out, it will activate a digital dialer transceiver 19. Alternate methods of actuating transceiver 19 are a manual emergency switch 20 and possibly a portable radio transmitter panic unit with a botton 21. One or more remote wired panic switches 22 may also be provided, for example in other rooms of the residence. The identification number of the unit may be mounted on the front thereof as indicated at 23 so that the caller or the person responding to an emergency may give this number to the central station if necessary. The connection from unit 16 to the main telephone lines 15 is indicated at 24.

Also mounted on unit 16 are auditory signal means generally indicated at 25 and visual signal means generally indicated at 26. These are arranged to operate simultaneously, and each signal means has three modes, an "alarm" mode indicated diagrammatically at 25a and 26a, a "call received" mode 25b and 26b and an "all clear" mode at 25c and 26c. For example, the "alarm" mode of signal 25 could be a series of closely spaced long beeps, the "call received" mode a series of short widely spaced blips and the "all clear" mode complete silence. Similarly, the "alarm" mode of visual signal 26 could be an occult light, that is, a closely spaced series of long illuminations, the "call received" signal could be a series of widely spaced short flashes, and the "all clear" signal extinguishment of lamp.

Central station 12 comprises a transceiver 27 compatible with transceiver 19 of unit 16. An example of such a central station transceiver is a digital dial central station transceiver manufactured by Sescoa (Security Sciences Corporation of America), Scottsdale, Arizona, Model 3210, having a visual readout 28 and a printer 29. This unit is triggered by an incoming telephone call and commands the calling communicator (in this case, transceiver 19), by means of a command component 30, to transmit its report. The report is transmitted two times and each message is stored in a separate register and compared bit for bit. In this case, the message would comprise an identification code 28a for the residence and an alarm code 28b which communicates whether the alarm was caused by an emergency button or the activityresettable timer 18. Upon receipt of a valid report, an "acknowledge" component 31 resets the calling communicator 19 so that it will discontinue dialing, and sounds an "alert" signal 32 which gives the attendant 33, say, ten seconds to press an "acknowledge" button 34. When the attendant presses this button 34, it will disenable a back-up warning output system (not shown). The communications between units 19 and 27, 30 and 31 may be by means of a telephone switched network 35 shown in FIG. 1.

Signal control means 36 is connected to transceiver 19 and is responsive to receipt by this transceiver of the acknowledgement signal from component 31 of the central station to change the mode of auditory signal 25 and visual signal 26 from 25a to 25b and from 26a to 26b respectively. This is the "call received" mode and will reassure the resident that his emergency call has been received and is being acted upon. These visual and auditory signals will continue until reset as noted below. Signal control means 36 could be a relay or an equivalent electronic component which controls shifting of the proper switches or other electronic elements in signal means 25 and 26.

A directory of information 37 is provided at the central station for the use of the central station operator 33. This directory may include information on monitored persons, referenced by identification number 23 of unit 16. After retrieving data pertinent to the resident, operator 33 may call the telephone 13 at the residence. If the telephone is answered, the operator will screen false alarms or render assistance as needed.

Information directory 37 also includes data on emergency responders who are available for each user of the service. Responders may be neighbors, relatives, friends, or representatives of housing projects, social agencies, churches, police or fire departments who have previously indicated their availability to proceed to a residence from which an emergency alarm has been emitted. The operator will call down the list of responders until one indicates he will investigate the alarm. Interrogation of the residence and, if necessary, dispatching of the responder, may be accomplished by means of the telephone 38 at the central station, travelling through a telephone switch network 39 and if necessary by other communication means such as radio.

An example of an emergency responding agency is indicated schematically at 40. An example of a neighbor or a friend contacted as an emergency responder is indicated at 41, the friend being shown as entering the residence for purposes of assistance.

A reset button 42 is provided on unit 16 which is available for activation by the person who responds to the emergency. If desired, this button may be combined with visual signal 26, the button being illuminated. Pressing button 42 will cause transceiver 19 to send an "all clear" signal to transceiver 27 at the central station. The transmission may be in the same form as previously, namely, the initial telephone call, a command from component 30 at the central station to transceiver 19 to transmit its report, and transmission of the message two times, the message being the identifying number 23 and an "all clear" code which is displayed on visual readouts 28a and 28b and printed on digital printer 29, and an "acknowledgement" signal from component 31 to transceiver 19, causing this transceiver to close its dialing and transmission. Upon receipt of a valid report, "alert" signal 32 will be illuminated and the attendant will then press the "acknowledge" button 34.

Means 43 is associated with and responsive to pressing of reset button 42 to cause auditory signal 25 and visual signal 26 to change their mode from the "call received" mode 25b and 26b to the "all clear" mode 25c and 26c. This means 43 could be in the form of relay means, switch means or the like.

If an "all clear" signal is not received within a reasonable time by operator 33, he may again refer to the directory 37 for another emergency responder who will be dispatched to the resident.

A complete sequence of operation of this system will now be described briefly. Actuation of digital dialer transceiver 19 by timer 18, panic button 22 or the other described activators will send a message to transceiver 27 at the central station indicating the identification of the residence and the alarm code. Simultaneously, auditory and visual signals 25 and 26 will be placed in their alarm mode. The central station will send an acknowledgement signal back to transceiver 19. Component 36, sensing this, will change the mode of residence signals 25 and 26 to the "call received" mode. The operator will dispatch help to the scene and upon arriving, the responder will activate reset button 42. This will cause an "all clear" message to be sent from transceiver 19 to the central station and will shift residence signals 25 and 26 to the "all clear" mode. Acknowledgement by the central station will reset transceiver 19.

While it will be apparent that the preferred embodiment of the invention disclosed is well calculated to fulfill the objects above stated, it will be appreciated that the invention is susceptable to modification, variation and change without departing from the proper scope or fair meaning of the subjoined claim.

I claim:

1. A closed-loop emergency alarm and response system comprising a first transceiver located at a residence, a compatible second transceiver at a central station, means at the residence for activating said first transceiver to send an alarm signal to said second transceiver, means at said second transceiver for sending a first "acknowledge" signal to the first transceiver after receipt of said alarm signal, indicating means at the residence having a "call received" made for indicating receipt of said "acknowledge" signal, signal means at the central station for facilitating the dispatch of emergency help to the residence after the sending of said first "acknowledge" signal, means at the residence operable by a person who has arrived at the residence in response to said dispatch from the central station to cause said residence transceiver to send an "all clear" signal to the central station transceiver, means at the central station for causing a second acknowledgement signal to be sent to the residence transceiver after receipt of said "all clear" signal, and means at the residence transceiver responsive to the receipt of said second "acknowledgement" signal for terminating said sending of the "all clear" signal.

2. A system according to claim 1, wherein said indicating means at the residence has an "alarm" mode activatable simultaneously with sending the alarm signal to said second transceiver, and means responsive to receipt of said first "acknowledge" signal for discontinuing said "alarm" mode.

3. A system according to claim 2, wherein said "call received" mode comprises a continuous "call received" signal, and means responsive to said person-operable means for discontinuing said "call received" signal.

* * * * *

UNITED STATES PATENT AND TRADEMARK OFFICE
CERTIFICATE OF CORRECTION

PATENT NO. : 4,064,368
DATED : December 20, 1977
INVENTOR(S) : Andrew S. Dibner

It is certified that error appears in the above—identified patent and that said Letters Patent are hereby corrected as shown below:

Column 1, line 9, "of", second occurrence, should be -- or --.

Column 1, line 34, "of", second occurrence, should be --to --.

Column 1, line 51, the word "transceiver" should be between the words "compatible" and "at" to read "a compatible transceiver at a central"

Column 4, claim 1, line 44, "made" should be --mode--

Column 4, claim 1, line 53, "acknowledgement" should not be in quotation marks

Signed and Sealed this

Fourth Day of April 1978

[SEAL]

Attest:

RUTH C. MASON
Attesting Officer

LUTRELLE F. PARKER
Acting Commissioner of Patents and Trademarks